(12) United States Patent
Maeda (10) Patent No.: US 7,106,395 B2
(45) Date of Patent: Sep. 12, 2006

(54) LIQUID CRYSTAL DISPLAY DEVICE AND ELECTRONIC APPARATUS

(75) Inventor: Tsuyoshi Maeda, Ryuo-cho (JP)

(73) Assignee: Seiko Epson Corporation, Tokyo (JP)

( * ) Notice: Subject to any disclaimer, the term of this patent is extended or adjusted under 35 U.S.C. 154(b) by 59 days.

(21) Appl. No.: 10/614,980

(22) Filed: Jul. 9, 2003

(65) Prior Publication Data

US 2004/0061812 A1 Apr. 1, 2004

(30) Foreign Application Priority Data

Jul. 22, 2002 (JP) .................................... 2002-212763

(51) Int. Cl.
*G02F 1/13* (2006.01)

(52) U.S. Cl. .............................. 349/65; 349/69; 349/112

(58) Field of Classification Search .................. 349/65, 349/112, 96
See application file for complete search history.

(56) References Cited

U.S. PATENT DOCUMENTS 6,359,670 B1 * 3/2002 Broer et al. ................ 349/115
RE38,305 E * 11/2003 Gunjima et al. ............... 349/9

FOREIGN PATENT DOCUMENTS

| JP | A 6-18879 | 1/1994 |
|---|---|---|
| JP | A 6-67004 | 3/1994 |
| JP | A 6-67178 | 3/1994 |
| JP | A 6-265892 | 9/1994 |
| JP | A 2001-143515 | 5/2001 |
| JP | A 2001-174633 | 6/2001 |
| JP | A 2001-235606 | 8/2001 |
| WO | WO 01/27528 A1 | 4/2001 |

* cited by examiner

*Primary Examiner*—James A. Dudek
(74) *Attorney, Agent, or Firm*—Oliff & Berridge, PLC (57) ABSTRACT

The invention provides a liquid crystal display device having a high display luminance and performs highly visibly display even in a bright outdoor environment. The invention also provides an electronic apparatus equipped with the same. A liquid crystal display device according to the present invention includes (i) a liquid crystal display panel having: a upper substrate and a lower substrate which are disposed so as to oppose each other; a liquid crystal layer sandwiched by the two substrates; an upper polarizer and a lower polarizer disposed above and below the liquid crystal layer, and (ii) a backlight (illumination device) disposed close to the rear surface of the liquid crystal display panel. The backlight includes a prism sheet which has a prism surface having a plurality of ribs, each having an approximately triangular cross-section, formed thereon close to the liquid crystal display panel, and which is arranged such that the prism surface faces in the opposite direction to the liquid crystal display panel. Also, the lower polarizer has a light diffusing layer and a reflective polarizer deposited in that order on the outer surface thereof.

11 Claims, 5 Drawing Sheets

LIQUID CRYSTAL DISPLAY DEVICE AND ELECTRONIC APPARATUS

BACKGROUND OF THE INVENTION

1. Field of Invention

The present invention relates to a liquid crystal display device and an electronic apparatus.

2. Description of Related Art

A related art transmissive liquid crystal display device has a backlight disposed close to the rear surface of a liquid crystal display panel thereof. Such a backlight may have a light source and a transparent light-guiding plate; the light source is disposed on a side surface of the light-guiding plate and is formed by a cold cathode fluorescent tube or a light-emitting diode and the light-guiding plate has a structure in which light incident from the light source is emitted toward the liquid crystal display panel while propagating therein.

In order to enhance the display luminance of such a liquid crystal display device, techniques of enhancing the utilization efficiency of the light source of the backlight by providing a prism sheet having a large number of grooves continuously formed thereon, each having a triangular cross-section, on the surface of the light-guiding plate of the backlight lying close to the liquid crystal display panel are disclosed in Japanese Unexamined Patent Application Publication Nos. 6-18879 and 6-67004.

SUMMARY OF THE INVENTION

When the foregoing backlight is used in the liquid crystal display device, since the utilization efficiency of the light source is enhanced and thus illumination light having a high luminance is obtained, the display luminance of the liquid crystal display device can be enhanced. However, the transmissive liquid crystal display device is subject to a problem in that its visibility deteriorates significantly when it is used in bright places, for example, outdoors in the daytime. That is, the luminance of external light is significantly higher than the display luminance of the transmissive liquid crystal display device, thereby resulting in deteriorated display visibility of the liquid crystal display device.

In particular, this deteriorated display visibility has caused a big problem when the transmissive liquid crystal display device is applied to a display unit of a portable electronic apparatus which is used outdoors.

The present invention addresses or solves the above and/or other problems, and provides a liquid crystal display device which performs display having a high display luminance and also high visibility even in a bright outdoor environment.

The present invention also provides an electronic apparatus equipped with the foregoing liquid crystal display device serving as a display unit.

In order to address or solve the above, a liquid crystal display device according to the present invention includes: (i) a liquid crystal display panel including: an upper substrate and a lower substrate disposed so as to oppose each other; a liquid crystal layer sandwiched between the two substrates; and an upper polarizer and a lower polarizer respectively disposed above and below the liquid crystal layer, and (ii) an illumination device disposed close to a rear surface of the liquid crystal display panel.

The illumination device includes a prism sheet which has a prism surface having a plurality of ribs, each having an approximately triangular cross-section, formed thereon close to the liquid crystal display panel, and which is arranged such that the prism surface faces in the opposite direction to the liquid crystal display panel. Also, the lower polarizer has a light diffusing layer and a reflective polarizer deposited in that order on an outer surface thereof.

The prism sheet having the above-mentioned structure is arranged such that the prism surface lies close to the rear surface of the transmissive liquid crystal display panel (remote from the display surface of the display panel) so as to face in the opposite direction to the liquid crystal display panel. With this arrangement, since part of light transmitted through the liquid crystal display panel and incident on the prism sheet is reflected off the prism surface and is emitted from the liquid crystal display panel, part of external light can be utilized as display light in the same fashion as in a reflective liquid crystal display panel, thereby achieving high visibility without deterioration in the display luminance of the liquid crystal display device even in an environment, such as a bright outdoor environment where high-intensity external light is incident.

Also, part of reflected light from the prism sheet has an output angle smaller than an incident angle of external light incident on the liquid crystal display panel. That is, since the part of reflected light of external light incident at an angle on the liquid crystal display device is emitted in a direction closer to the normal of the liquid crystal display panel than the incident light (so-called off-axis reflection), the part of reflected light is very suitable as display light of the liquid crystal display device.

In addition, in the liquid crystal display device according to the present invention, the liquid crystal display panel has the light diffusing layer disposed on the outer surface of the lower polarizer. With this structure, part of external light incident at an angle on the liquid crystal display panel and regularly reflected off the prism sheet or the reflector of the illumination device also becomes available as display light which is emitted in a direction closer to the normal of the display panel due to an operation of the light diffusing layer, after the external light is incident on the liquid crystal display panel. Accordingly, when external light is incident on the liquid crystal display device, the display device has a higher luminance compared to the case in which the off-axis reflection of the prism sheet is only available.

Furthermore, since the light diffusing layer is disposed, the profiles, flaws, or the like of the light-guiding plate and the prism sheet of the illumination device are invisible to an operator, thereby leading to improved display quality of the liquid crystal display device.

Moreover, in the liquid crystal display device according to the present invention, the reflective polarizer is deposited on the light diffusing layer. With this structure, the luminance of transmissive display utilizing light emitted from the illumination device can be enhanced, and in addition, when external light is incident on the display device, the utilization efficiency of the external light as display light, which is reflected off the prism sheet or the reflector of the illumination device, can be enhanced. More particularly, an advantage of the reflective polarizer reflecting part of light to provide recycling, which is incident on the rear surface of the liquid crystal display panel and is not transmitted through the lower polarizer, works effectively to external light reflected off the prism sheet or the reflector of the illumination device, thereby further enhancing display visibility.

As described above, in the liquid crystal display device according to the present invention, external light incident on liquid crystal display device in a bright outdoor environment is utilized as display light which is emitted in a direction close to the normal of the liquid crystal display panel due to the off-axis reflection of the prism sheet and the light diffusion of the light diffusing layer, and also the utilization efficiency of the reflected light as display light is enhanced by the reflective polarizer, thereby dramatically increasing a display luminance and achieving high visibility when external light is incident on the display device.

Next, in the liquid crystal display device according to the present invention, each of the ribs of the prism sheet preferably has an apex in the range from 63 degrees to 68 degrees.

By setting the apex angle of each rib of the prism sheet in the above-mentioned range, the off-axis reflection of the prism sheet allows reflected light to be emitted in a direction closer to the normal of the liquid crystal display panel, thereby further enhancing a substantial display luminance.

Next, in the liquid crystal display device according to the present invention, the liquid crystal layer may include TN liquid crystal, and the liquid crystal display panel preferably has a clear viewing direction in the direction of about six o'clock.

With this structure, a shadow of a dark display dot is unlikely to occur in use when external light is incident on the liquid crystal display panel, thereby achieving a liquid crystal display device which is more highly visible. The clear viewing direction is defined by the rising direction of a part of liquid crystal molecules forming the liquid crystal layer, the part lying in the almost central portion of the liquid crystal layer with respect to the thickness direction thereof.

Next, in the liquid crystal display device according to the present invention, the ribs of the prism sheet preferably extend in a direction substantially orthogonal to an incident direction of external light in use.

This structure provides a liquid crystal display device suitable for use in an application in which external light is incident on the display surface thereof obliquely from above. Since the off-axis reflection of the prism sheet works most effectively to light incident in a direction orthogonal to the extending direction of the ribs of the prism surface, by arranging the prism sheet as described above, light incident on the display surface obliquely from above is effectively reflected in a direction close to the normal of the display surface, thereby enhancing a display luminance in use.

Next, in the liquid crystal display device according to the present invention, the illumination device may include a light source and a light-guiding plate, and the light source is preferably disposed on an end surface of the light-guiding plate, the end surface extending orthogonal to the width direction of the ribs of the prism sheet.

With this structure, the conversion efficiency of light emitted from the upper surface of the light-guiding plate (close to the prism sheet) and converted into light propagating in a direction close to the normal of the liquid crystal display panel due to an operation of the prism sheet can be enhanced, thereby achieving a liquid crystal display device which substantially enhances the utilization efficiency of the light source, and thus enhances a display luminance.

Next, in the liquid crystal display device according to the present invention, the transmissive polarization axes of the lower polarizer and the reflective polarizer are preferably arranged so as to be substantially parallel to each other.

With this structure, since light transmitted through the reflective polarizer is most effectively transmitted through the lower polarizer, the amount of illumination light incident on the liquid crystal display panel can be increased, thereby enhancing the display luminance of the liquid crystal display device.

Next, in the liquid crystal display device according to the present invention, the transmissive polarization axes of the lower polarizer and the reflective polarizer are preferably arranged so as to form an angle in the range from −30 degrees to 30 degrees.

Although it is the most preferable that the transmissive polarization axes of the lower polarizer and the reflective polarizer be arranged so as to be parallel to each other, when an angle formed by the two axes lies in the above-mentioned range, the utilization efficiency of the illumination light lies in a practically allowable range.

Next, in the liquid crystal display device according to the present invention, the light diffusing layer preferably has a haze value in the range from 60% to 85%.

With this arrangement, without significantly reducing the amount of light transmitted through the light diffusing layer, part of light obliquely incident on the diffusing layer is emitted in a direction close to the normal of the liquid crystal display panel. Of light obliquely incident on the liquid crystal display device, light which is regularly reflected off the prism sheet or the illumination device and which is incident on the rear surface of the liquid crystal display panel is diffused by the light diffusing layer so that part of the light is emitted in a direction close to the normal of the liquid crystal display panel, thereby enhancing the substantial luminance of the liquid crystal display device.

An electronic apparatus according to the present invention includes the foregoing liquid crystal display device according to the present invention. The electronic apparatus having equipped with the liquid crystal display device according to the present invention as a display unit has high visibility even in an environment where external light is incident on the liquid crystal display panel.

DETAILED DESCRIPTION OF PREFERRED EMBODIMENTS

Exemplary embodiments of the present invention are described below with reference to the accompanying drawings.

Figure 1:
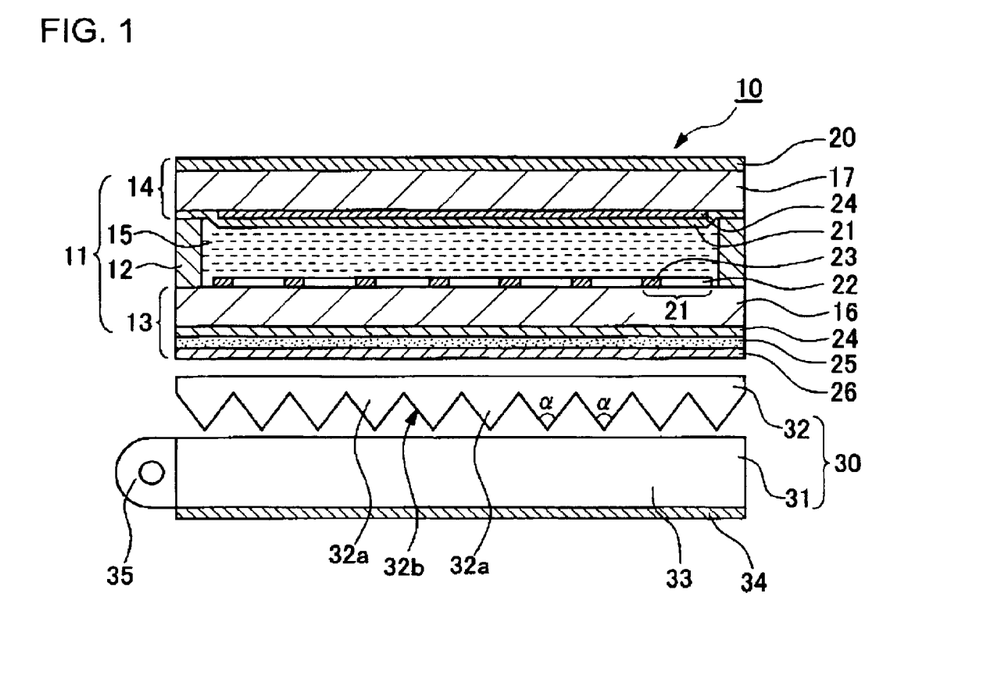
FIG. 1 is a sectional view of the structure of a liquid crystal display device according to an exemplary embodiment of the present invention.

FIG. 1 is a sectional view of a liquid crystal display device 10 according to the present invention. As shown in FIG. 1, the liquid crystal display device 10 includes a transmissive liquid crystal display panel 11 and a backlight (illumination device) 30.

The liquid crystal display panel 11 is of an active-matrix type having a structure in which a liquid crystal layer 15 composed of TN (twisted nematic) liquid crystal is sandwiched between an array substrate 13 and a counter substrate 14 which are disposed so as to oppose to each other, and is sealed by a sealant 12 having an approximately rectangular shape in plan view. The array substrate 13 includes a transparent lower substrate 16 composed of glass or the like, and has a plurality of pixels 21 formed in a matrix array in plan view close to the liquid crystal layer 15. Each pixel 21 includes a pixel electrode 22 composed of a transparent conductive material and a TFT (thin film transistor) element 23 connected to the pixel electrode 22, for switching the pixel electrode 22. Although not shown in FIG. 1, an alignment film is formed on the pixels 21.

The lower substrate 16 has a lower polarizer 24, a light diffusing layer 25, and a reflective polarizer 26 laminated in that order on the outer surface thereof (remote from the liquid crystal layer 15). The lower polarizer 24 and the reflective polarizer 26 are arranged such that the transmissive polarization axes thereof are substantially parallel to each other. When the light diffusing layer 25 is made from, for example, a light-diffusing adhesive agent, it serves also as a bonding member between the lower polarizer 24 and the reflective polarizer 26.

Preferably, the light diffusing layer 25 has a haze value in the range from 60% to 85%. The haze value is defined by the ratio of diffused light to transmissive light including the diffused light. When the haze value is less than 60%, the less amount of light is diffused; hence, it is difficult to obtain a sufficient amount of light, which is incident on the light diffusing layer at an angle, from the front surface of the liquid crystal display panel. When the value exceeds 85%, the transmissive display luminance of the front surface of the liquid crystal display panel deteriorates drastically.

The counter substrate 14 is equipped with a transparent upper substrate 17 composed of glass or the like, and also has counter electrodes 18, made from a solid-like film composed of a transparent conductive material, and an alignment film 19 formed so as to cover the counter electrodes 18, both being disposed close to the liquid crystal layer 15. Also, the counter substrate 14 has an upper polarizer 20 formed on the outer surface of the upper substrate 17.

The backlight 30 is equipped with an illuminating portion 31 and a prism sheet 32. The prism sheet 32 is disposed between the illuminating portion 31 and the liquid crystal display panel 11.

The prism sheet 32 is a flat member composed of a transparent resin such as acrylic resin, and has a prism surface 32b on one surface thereof having a plurality of ribs 32a, each having a triangular cross-section in sectional view and extending in a direction perpendicular to the plane of the figure. The ribs 32a are repeatedly disposed so as to be parallel to each other. All of the plurality of ribs 32a have a common apex angle α. Although the rib 32a of the prism surface 32b has a triangular cross-section with an acute top by way of example in this exemplary embodiment, the rib 32a having a sectional shape with a rounded top may be used without causing any problem.

The illuminating portion 31 is equipped with a flat, transparent light-guiding plate 33, a light source 35 disposed at one side surface (the left side surface in the figure) of the light-guiding plate 33 and having a light-emitting element such as a cold cathode fluorescent tube, or an LED (light emitting diode), and a reflector 34 disposed on the rear surface of the light-guiding plate 33 (remote from the liquid crystal display panel 11).

The prism sheet 32 is arranged such that the ribs 32a extend parallel to the side surface of the light-guiding plate 33 along which the light source 35 is disposed. In other words, the prism sheet 32 is arranged such that light emitted from the light source 35 and incident on the light-guiding plate 33 is mainly guided in a direction (a horizontal direction in the figure) at a right angle with the extending direction of the ribs 32a. With this arrangement, the prism sheet 32 more effectively controls the illumination light.

In the backlight 30 according to the present invention, the prism surface 32b of the prism sheet 32 is arranged so as to oppose the light-guiding plate 33 of the illuminating portion 31. With this arrangement, external light incident on the liquid crystal display device 10 and transmitted through the liquid crystal display panel 11 is reflected off the inner surface of the prism sheet 32 so as to serve as display light, because the incident light is subjected to off-axis reflection by the prism sheet 32 arranged in the direction shown in FIG. 1. More particularly, since light reflected by the prism sheet 32 includes regularly reflected light and irregularly reflected light which is emitted from the prism sheet 32 in a direction different from the regularly reflecting direction, the liquid crystal display device 10 according to this exemplary embodiment is arranged such that the irregularly reflected light is emitted in a direction closer to the normal of the prism sheet 32 (to the normal of the liquid crystal display panel 11) compared to the regularly reflected light, so that the reflected light of the external light can be utilized as reflective display light traveling substantially in the same direction as that of transmissive display light emitted from the illuminating portion 31.

Figure 2:
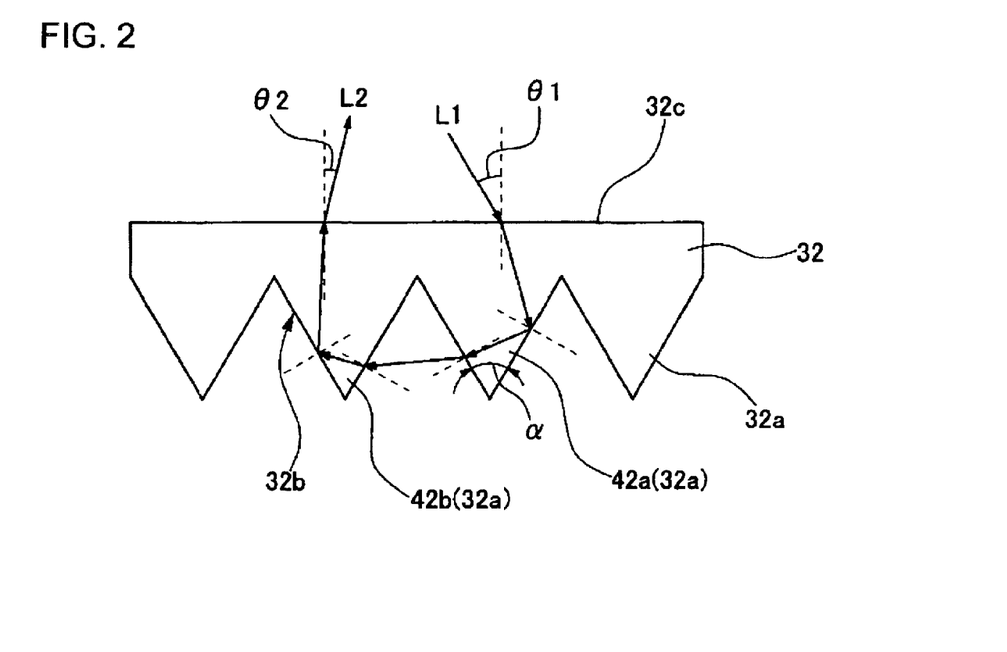
FIG. 2 is a schematic that illustrates off-axis reflection by a prism sheet shown in FIG. 1.

FIG. 2 is a sectional view in part of the structure of the prism sheet 32 shown in FIG. 1 illustrating a model of the off-axis reflection by the foregoing prism sheet 32.

In FIG. 2, the liquid crystal display panel 11 is disposed close to an upper surface 32c of the prism sheet 32, and the illuminating portion 31 of the backlight 30 is disposed at the lower side in the figure.

It is believed that the off-axis reflection by the prism sheet 32 according to the present invention occurs when external light is reflected along a path shown in FIG. 2. That is, incident light L1 transmitted through the liquid crystal display panel 11 and incident on the upper surface 32c of the prism sheet 32 at an incident angle θ1 is reflected by two adjacent ribs 42a and 42b of the plurality of ribs 32a of the prism surface 32b, and is emitted from the upper surface 32c of the prism sheet 32 as output light L2. More particularly, the incident light L1 is first transmitted through the prism sheet 32; is incident on and reflected off the inner surface of the illustrated right slope of the rib 42a; and is then incident on the inner surface of the illustrated left slope thereof. Then, the light is emitted outside the prism sheet 32 from the left side slope and is incident on the prism sheet 32 from the illustrated right slope (close to the rib 42a) of the rib 42b next to the rib 42a. Subsequently, the light is reflected off the illustrated left slope of the rib 42b and is emitted from the upper surface 32c of the prism sheet 32 as the output light L2 at an output angle θ2.

In the off-axis reflection illustrated by the model shown in FIG. 2, when the incident angle θ1 of incident light L1 and the refractive index of the prism sheet 32 are constant, the output angle θ2 of the output light L2 is determined by the apex angle α of the rib 32a of the prism surface. Table 1 shows the calculated results of the relationship between the apex angle α of the rib 32a and the output angle θ2 of the output light L2, when the incident angle θ1 of the incident light L1 is 30 degrees (an incident angle of typical external light incident on display unit of a portable electronic apparatus) and the refractive index of the prism sheet 32 is 1.45 (that is, the prism sheet 32 is composed of acrylic resin). As shown in the table, the output angle of off-axis reflection light varies in accordance with the apex of the rib 32a, and, in the range shown in Table 1, as the apex angle α becomes larger, the output angle θ2 is more deviated from the regularly reflecting output angle (30 degrees) of the incident light L1.

In order for the output light L2 to be emitted in a direction along which an operator squarely sees the front surface of the portable electronic apparatus, the output angle lies preferably in the range from about 0 degrees to 20 degrees. Accordingly, in order for the off-axis reflection light to be emitted in the above range, it is sufficient that the apex angle α of the rib 32a is set in the range of 63 degrees to 68 degrees.

TABLE 1

| apex angle α (deg.) | output angle θ2 (deg.) |
| --- | --- |
| 61 | 26.3 |
| 62 | 22.6 |
| 63 | 18.9 |
| 64 | 15.2 |
| 65 | 11.5 |
| 66 | 7.7 |
| 67 | 3.9 |
| 68 | −0.1 |
| 69 | −4.2 |
| 70 | −8.5 |

Figure 3:
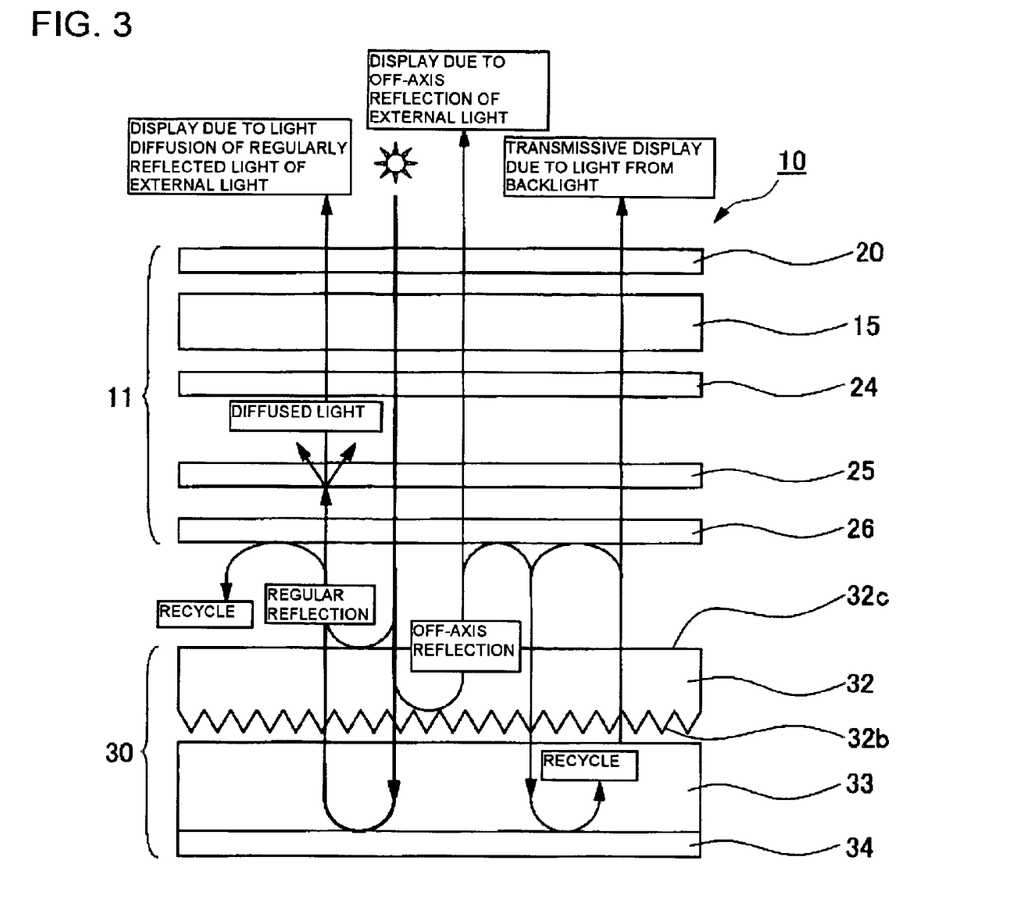
FIG. 3 is a schematic that illustrates an operation of each significant part of the liquid crystal display device shown in FIG. 1.

Next, an operation of each major part of the liquid crystal display device 10 having the above structure according to this exemplary embodiment is described below with reference to FIG. 3 which is a schematic of the liquid crystal display device 10.

When external light is incident on the liquid crystal display device 10 according to this exemplary embodiment, the incident light is transmitted through dots in bright display of the liquid crystal display panel 11 and reaches the backlight 30. Although the incident light is reflected by the backlight 30 towards the liquid crystal display panel 11, the reflected light includes light subjected to the off-axis reflection by the prism surface 32b of the prism sheet 32 and regularly reflected light by the upper surface 32c of the prism sheet 32 and the reflector 34.

In the following description, it is assumed that the liquid crystal display device 10 according to the present invention is applied to a display unit of a portable electronic apparatus, and that external light is incident, at a predetermined incident angle (for example, 30 degrees), on the liquid crystal display panel 11 and the off-axis reflection light of the external light is emitted along the normal of the liquid crystal display panel 11 (that is, in a direction along which an operator squarely sees the front surface of the liquid crystal display panel 11). That is, the apex angle a of the rib 32a of the prism surface 32b is adjusted such that the foregoing off-axis reflection light of external light coming from a predetermined incident direction is emitted in a direction along which the operator squarely sees the liquid crystal display panel 11.

First, light transmitted through the prism sheet 32 and subjected to the off-axis reflection by the prism surface 32b will be described. This light produced on the inner surface of the prism surface 32b of the prism sheet 32 is incident on the reflective polarizer 26 via the upper surface 32c of the prism sheet 32; part of the light is transmitted through the reflective polarizer 26 and incident on the light diffusing layer 25; is transmitted through the light diffusing layer 25 and the lower polarizer 24; and is incident on the liquid crystal layer 15 so as to serve as display light. Meanwhile, the other part of the light reflected off the reflective polarizer 26 is incident on the backlight 30; is reflected again off the prism sheet 32 of the backlight 30 or the reflector 34; and is incident on the liquid crystal display panel 11 so as to be recycled. Although most of the recycled light is reflected again off the reflective polarizer 26, since such repeated reflection causes the state of polarization of the light to be changed, part of the light is transmitted through the reflective polarizer 26 so as to serve as display light, thereby resulting in an increased amount of display light.

Next, light regularly reflected off the upper surface 32c of the prism sheet 32 or the reflector 34 will be described. Part of the above-mentioned regularly reflected light, which is transmitted through the reflective polarizer 26, is incident on the liquid crystal layer 15 via the light diffusing layer 25 and the lower polarizer 24 and is emitted from the display surface of the liquid crystal display panel 11. Since this part of the regularly reflected light is produced from external light which is incident at an angle on the liquid crystal display panel 11, most of this part does not contribute to producing display. Hence, in the liquid crystal display device 10 according to this exemplary embodiment, its display luminance is improved by disposing the light diffusing layer 25 between the reflective polarizer 26 and the lower polarizer 24 so as to diffuse light transmitted through the reflective polarizer 26 and to utilize part of the diffused light propagating along the normal of the liquid crystal display panel 11. Since the largest amount of reflected light of external light comes from the regularly reflected light, if part of the regularly reflected light can be utilized as display light, that part contributes to enhancing the display luminance to a large extent.

Also, when part of the regularly reflected light, which is reflected off the reflective polarizer 26, is recycled in the same fashion as the foregoing off-axis reflection light, the regularly reflected light contributes more to producing display so as to make the display brighter.

In addition, since any of the foregoing reflected light is transmitted through the light diffusing layer 25 before being incident on the liquid crystal layer 15, the profiles, flaws, or the like of the prism sheet 32 and the light-guiding plate 33 are hardly visible to an operator, thereby resulting in enhanced display quality.

As described above, since the liquid crystal display device 10 according to this exemplary embodiment has a structure in which, when used in bright places, for example, in a bright outdoor environment, external light incident on the liquid crystal display panel 11, which has in the related art caused deterioration in visibility of a transmissive liquid crystal display device, is positively utilized to produce display, and also since the liquid crystal display device is appropriately constructed so as to utilize reflected light as display light, the liquid crystal display device has a high display luminance and high visibility, even in bright places.

Also, in transmissive display using illumination light from the backlight 30, light emitted from the light-guiding plate 33 is incident on the reflective polarizer 26 via the prism sheet 32, and part of the light, which is transmitted through the reflective polarizer 26, is sequentially transmitted through the light diffusing layer 25 and the lower polarizer 24 and is incident on the liquid crystal layer 15 so as to serve as display light. Meanwhile, the other part of the light, which is reflected off the reflective polarizer 26, returns to the backlight 30 in the same fashion as the reflected light of the external light; is repeatedly reflected between the reflector 34 lying on the rear surface of the light-guiding plate 33 and the reflective polarizer 26; and, when its polarization state varies during the repeated reflection, part of the other part of the light is transmitted through the reflective polarizer 26 so as to be recycled. The light diffusing layer 25 also works to conceal the profile of the backlight 30, thereby achieving high-quality display. Accordingly, the liquid crystal display device 10 according to this embodiment achieves high-quality display with a high luminance even in the transmissive display using the illumination light from the backlight 30.

Figure 4:
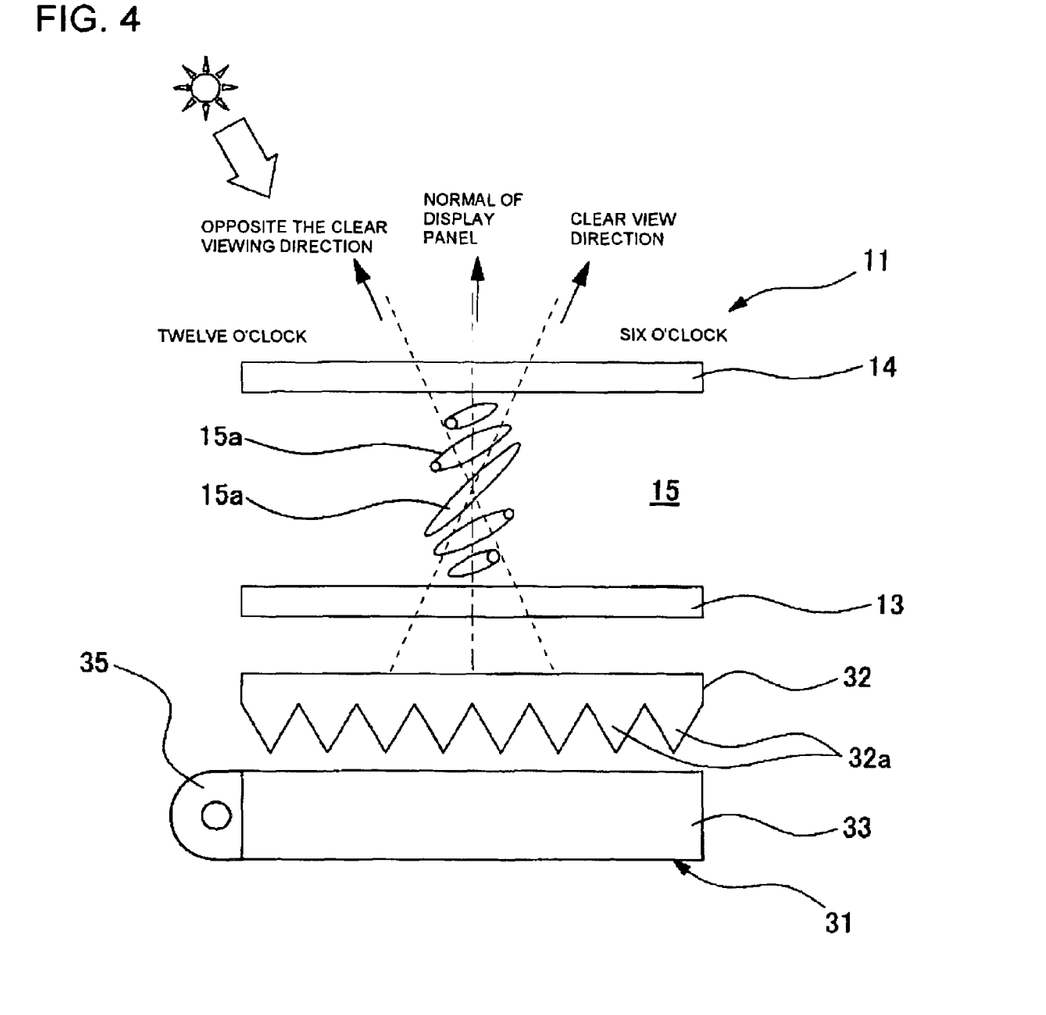
FIG. 4 is a schematic that illustrates the positional relationship between the liquid crystal display device according to the present invention and an incident direction of external light.

Furthermore, in the liquid crystal display device 10 according to this exemplary embodiment, on top of that the reflected light of external light is utilized as display light, since the clear viewing direction of the liquid crystal display panel 11 and the arrangement of the prism sheet 32 with respect to an operator in use are appropriately designed, when the liquid crystal display device 10 is applied to a display unit of a portable electronic apparatus or the like in which the positional relationship between the operator and the liquid crystal display device 10 is substantially fixed, its visibility when external light is incident thereon can be further enhanced. FIG. 4 is a schematic of such an arrangement, and, of the components of the liquid crystal display device 10 shown in FIG. 1, only necessary ones for illustration are shown in FIG. 4. That is, the counter substrate 14, the array substrate 13, the liquid crystal layer 15 sandwiched between these two substrates, a plurality of liquid crystal molecules 15a forming the liquid crystal layer 15, the prism sheet 32 disposed close to the rear surface of the array substrate 13, and the illuminating portion 31 are shown.

As shown in FIG. 4, in the liquid crystal display device according to this exemplary embodiment using TN liquid crystal, in a state in which a voltage is not applied, the liquid crystal molecules 15a of the liquid crystal layer 15 are oriented in a twisted condition and are also disposed at a predetermined rising angle in the liquid crystal layer 15. In the liquid crystal display panel 11 having such a liquid crystal layer 15, the clear viewing direction is defined by the rising direction of a part of the plurality of liquid crystal molecules 15a arrayed in the thickness direction of the liquid crystal layer 15, the part lying in the central portion of the liquid crystal layer 15 with respect to the thickness direction thereof. Also, as shown in FIG. 4, the direction opposite to the clear viewing direction is referred to as opposite the clear viewing direction.

Figure 5:
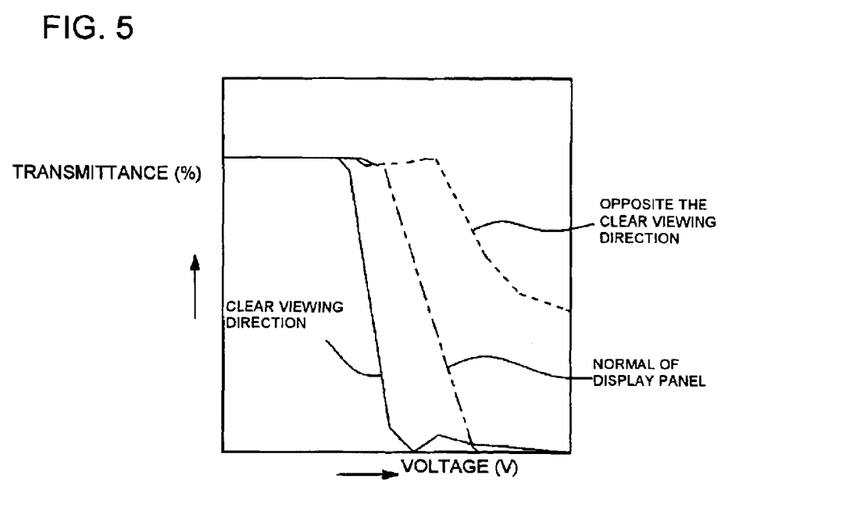
FIG. 5 is a graph illustrating relationships between observing directions and transmittances.

FIG. 5 is a graph showing the voltage dependencies of the transmittances of the transmissive liquid crystal display panel including the liquid crystal layer composed of TN liquid crystal, measured from the clear viewing direction, opposite the clear viewing direction, and the normal of the display panel. As shown in FIG. 5, even though the same liquid crystal display panel is used, its transmittance against a voltage varies depending on the observation directions, and, with respect to the commonly applied voltage, the transmittance observed from the clear viewing direction decreases by a larger amount compared to those observed from the other two directions.

In the liquid crystal display device 10 according to this exemplary embodiment, by setting the clear viewing direction at the direction of six o'clock (that is, the side closer to an operator), high-contrast display can be achieved, and, in an environment where external light is incident on the liquid crystal display panel 11, since a shadow of a dark display dot is reduced or prevented from occurring in the liquid crystal display device 10, highly visible display can be achieved. Also, large part of external light coming from opposite the clear viewing direction reaches the illumination device, since the liquid crystal display panel 11 has a high transmittance. By utilizing this light, bright reflective display can be achieved.

Also, in the liquid crystal display device 10 according to this exemplary embodiment, the liquid crystal display panel 11 and the illumination device 30 are preferably arranged such that the width direction of the ribs 32a of the prism sheet 32 lies in the direction of six o'clock to twelve o'clock, as shown in FIG. 4. That is, the ribs 32a of the prism sheet 32 are preferably formed so as to extend horizontally when viewed from an operator. Since external light is often incident on a display unit of a portable electronic apparatus or the like, from above or from the above front of an operator sitting in front of the liquid crystal display device, and light incident on the display unit from a direction orthogonal to the extending direction of the ribs 32a is most effectively subjected to the off-axis reflection by the foregoing prism sheet 32, when the liquid crystal display device is applied to a portable electronic apparatus or the like in which the positional relationship between a light source of external light and the operator can be presumed, the liquid crystal display device preferably has a structure shown in FIG. 4.

In the foregoing exemplary embodiment, although an active-matrix liquid crystal display panel including TFT elements is used by way of example as the liquid crystal display panel 11, the liquid crystal display device according to the present invention has no limitation as to driving its liquid crystal as long as it is formed by a transmissive liquid crystal display panel, and it is applicable without any problems even when it is formed by a TFD-type (thin film diode-type) display panel or a simple matrix display panel. Alternatively, it may be formed by a color display panel.

EXAMPLES

The advantages of the present invention will be more apparent by the following Examples. In these Examples, the liquid crystal display devices according to the foregoing exemplary embodiment and a liquid crystal display device having a related art or known structure were prepared and the reflectance characteristics thereof were evaluated. Also, the display visibilities thereof in dark and bright places were checked.

Example 1

A TFD-type transmissive color liquid crystal display panel applicable to a display unit of a portable electronic apparatus was prepared. In the liquid crystal display panel, an anti-reflective film, an upper polarizer, an upper substrate, a liquid crystal layer, a lower substrate, a lower polarizer, a diffusing adhesive agent (light diffusing layer), and a reflective polarizer are disposed in that order from the display surface thereof; color filters with an NTSC ratio of 30% are used; and the aperture ratio thereof is 82%.

Then, a liquid crystal display device in Example 1 was fabricated by disposing a backlight, which includes a prism sheet made by 3M Company and having ribs with an apex angle of 66 degrees formed on its prism surface, close to the rear surface of the above-mentioned liquid crystal display panel.

The prism sheet is disposed such that the prism surface opposes the light-guiding plate of the backlight. Also, a reflector is disposed on the rear surface of the light-guiding plate of the backlight.

Example 2

A liquid crystal display device in Example 2 was fabricated by disposing a backlight, which includes a prism sheet made by Mitsubishi Rayon Co., Ltd. and having ribs with an apex angle of 63 degrees formed on its prism surface, close to the rear surface of the liquid crystal display panel having the same structure as that in Example 1. In this Example, the prism sheet is also disposed such that its prism surface opposes the light-guiding plate of the backlight, and the backlight used in Example 2 has the same structure as that in Example 1 except for the prism sheet.

Comparative Example

Next, a backlight, having a structure in which two prism sheets (brand name: BEF) made by 3M Company, each having ribs with an apex angle of 90 degrees formed on its prism surface, are disposed one above the other on the light-guiding plate of the illuminating portion such that the ribs of these two prism sheets extend orthogonal to each other, was prepared, and a liquid crystal display device in Comparative Example was fabricated by disposing the backlight close to the rear surface of the liquid crystal display panel having the same structure as that in the foregoing Example 1. The foregoing two prism sheets are disposed such that both the prism surfaces thereof oppose the liquid crystal display panel.

(Measurement of Reflectance)

The reflectance of each of the liquid crystal display devices fabricated in the foregoing Examples 1 and 2, and Comparative Example was measured. A measuring light source was a ring light and an incident angle of light from the light source was set at 15 degrees. The measured results are shown in Table 2. Relative reflectances of Examples 1 and 2 are also shown in Table 2 with respect to the reflectance of the liquid crystal display device equipped with the backlight having a conventional structure in Comparative Example.

As shown in Table 2, the liquid crystal display devices in Examples 1 and 2 satisfying the structural requirements of the present invention have higher reflectances by about 20% compared to that of the liquid crystal display device in Comparative Example.

TABLE 2

|  | reflectance (%) | relative reflectance |
|---|---|---|
| Example 1 | 6.56 | 1.22 |
| Example 2 | 6.37 | 1.18 |
| Comparative Example | 5.38 | 1.00 |

Next, in order to check the enhanced effect of the reflectance by using the prism sheet having the structure according to the present invention, each of the liquid crystal display devices in the foregoing Examples 1 and 2, and Comparative Example was constructed so as to have only the prism sheet disposed close to the rear surface of the liquid crystal display panel by removing the light-guiding plate and the reflector disposed on the rear surface thereof, and reflectances of these liquid crystal display devices were measured in the same way as mentioned above. The measured results are shown in Table 3. Likewise as shown in Table 2, relative reflectances of the liquid crystal display devices in Examples 1 and 2 with respect to the reflectance of the liquid crystal display device in Comparative Example are also shown in the Table 3.

As shown in Table 3, with the structure of the prism sheet according to the present invention, the liquid crystal display devices in Examples 1 and 2 have higher reflectances by about 50% compared to that with the prism sheet having a conventional structure.

TABLE 3

|  | reflectance (%) | relative reflectance |
|---|---|---|
| Example 1 | 2.80 | 1.55 |
| Example 2 | 2.62 | 1.45 |
| Comparative Example | 1.81 | 1.00 |

(Visibility in Outdoor Environment)

Next, in order to check the improvement in visibility of the transmissive liquid crystal display device in a bright outdoor environment by constructing the display device according to the present invention, the liquid crystal display devices in Example 1 and Comparative Example fabricated as mentioned above were operated in a dark place and a bright outdoor environment (at 100,000 lx), and the luminances and contrasts thereof were measured. The measured results are shown in Table 4.

As shown in Table 4, the liquid crystal display device according to the present invention has a satisfactory luminance and contrast in a dark place and also has a drastically enhanced luminance and contrast in a bright environment compared to those of the liquid crystal display device in Comparative Example. In particular, the contrast of the former liquid crystal display device becomes 10 times or more than that of the latter one; as a result, it is confirmed that highly visible display can be achieved even in a bright environment.

TABLE 4

|  | outdoor environment luminance (cd/m$^2$) (contrast) | dark place luminance (cd/m$^2$) (contrast) |
|---|---|---|
| Example 1 | 1000 (20) | 200 (100) |
| Comparative Example | 400 (1.6) | 200 (100) |

(Light Diffusing Layer)

Next, in the liquid crystal display device according to the present invention, the effectiveness of the light diffusing layer which is a component thereof contributing to improving the substantial luminance thereof was checked from the viewpoint of its haze value.

In this example, light diffusing layers having a variety of haze values were fabricated for liquid crystal display panels having the same basic structure as that of the liquid crystal display device in the foregoing Example 1, and each of the corresponding liquid crystal display devices was fabricated by disposing a backlight, which includes the prism sheet made by 3M Company and having ribs with an apex angle of 66 degrees formed on its prism surface, close to the rear surface of the corresponding liquid crystal display panel.

Then, a reflectance of each of the liquid crystal display devices fabricated as mentioned above in a direction close to the normal of the corresponding panel was measured when illuminated by a ring-shaped light source. The measured results are shown in Table 5.

As shown in Table 5, when the light diffusing layer of the liquid crystal display panel is formed so as to have a haze value of 60% to 85%, the reflectance of the liquid crystal display device can achieve a reflectance of 6% or more, which is greater by 50% or more compared to the reflectance of 4% of the front surface of the liquid crystal display panel, which does not contribute to producing display.

TABLE 5

| haze value | 55% | 60% | 70% | 85% | 90% |
|---|---|---|---|---|---|
| reflectance | 5.5% | 6.1% | 6.5% | 6.3% | 5.8% |

(Arrangement of Prism Sheet)

Next, in the liquid crystal display device according to the present invention, in order to check the enhanced effectiveness of the substantial display luminance by appropriately arranging the prism sheet with respect to an incident direction of external light, the intensities of reflected light of the liquid crystal display devices in the foregoing Examples 1 and 2 were measured in two cases in which the ribs of the corresponding prism sheets are arranged so as to extend parallel and orthogonal to the incident direction of external light.

In this example, the intensities of reflected light of the liquid crystal display devices were measured by using a measuring light source which emits spot light and by setting the incident angle at −30 degrees with respect to the normal of the liquid crystal display panels. Also, by detecting the reflected light by scanning the liquid crystal display panels in the range from 0 degrees to 60 degrees with respect to the foregoing normal with a detector, the dependency of the reflected light on its output angle was checked. The measured results are illustrated by the graph shown in FIG. 6. In the graph shown in FIG. 6, the horizontal axis represents an angle of the detector and the vertical axis represents a reflected light intensity. Also, in these graphs, a solid line (Example 1 (orthogonal)) and a dotted line (Example 2 (orthogonal)) represent the cases in which external light is incident on the liquid crystal display panels of the liquid crystal display devices in Examples 1 and 2, respectively, so as to be orthogonal to the extending directions of the ribs of the corresponding prism sheets thereof, and a two-dotted chain line (Example 1 (parallel)) and a dotted chain line (Example 2 (parallel)) represent the cases in which external light is incident on the liquid crystal display panels of the liquid crystal display devices in Examples 1 and 2, respectively, so as to be parallel to the extending directions of the ribs of the corresponding prism sheets thereof.

Figure 6:
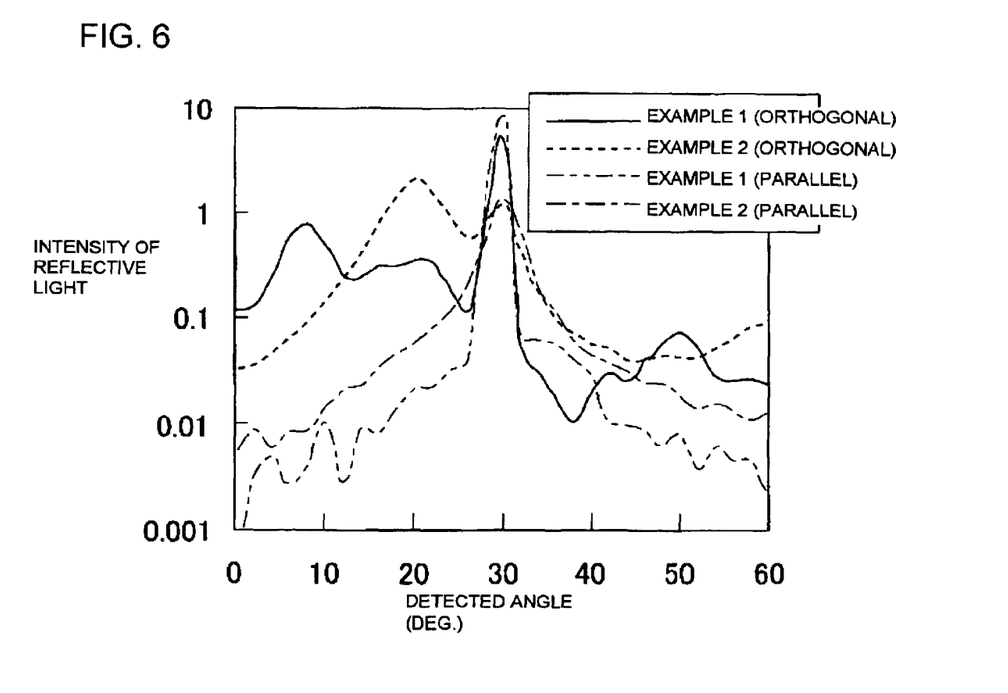
FIG. 6 is a graph of measured results of the intensities of reflected light according to Examples of the present invention.

As shown in FIG. 6, when the ribs of the prism sheet are arranged so as to extend orthogonal to the incident direction of external light, it is confirmed that the liquid crystal display device (having the ribs with an apex angle of 66 degrees) in Example 1 exhibits a peak intensity of reflected light at an angle of about 10 degrees and the liquid crystal display device (having the ribs with an apex angle of 63 degrees) in Example 2 exhibits a peak intensity of reflected light at an angle of about 20 degrees. With these results, when the ribs of the prism sheet are arranged so as to extend orthogonal to the incident direction of external light, part of the external light is reflected in a direction close to the normal of the liquid crystal display panel so as to serve as preferable display light, whereby the substantial display luminance can be enhanced. Also, the foregoing angles of the peak intensities of reflected light approximately agree with the output angle of light, which is subjected to the off-axis reflection, calculated on the basis of the model shown in FIG. 2. Accordingly, these results suggest that, when the incident angle of external light is 30 degrees, by arranging the ribs of the prism sheet so as to have an apex of 68 degrees, the intensity of reflected light in a direction close to the normal of the liquid crystal display panel can be enhanced.

(Exemplary Electronic Apparatus)

Exemplary electronic apparatuses, each equipped with the liquid crystal display device according to the foregoing exemplary embodiment, are described below.

Figure 7:
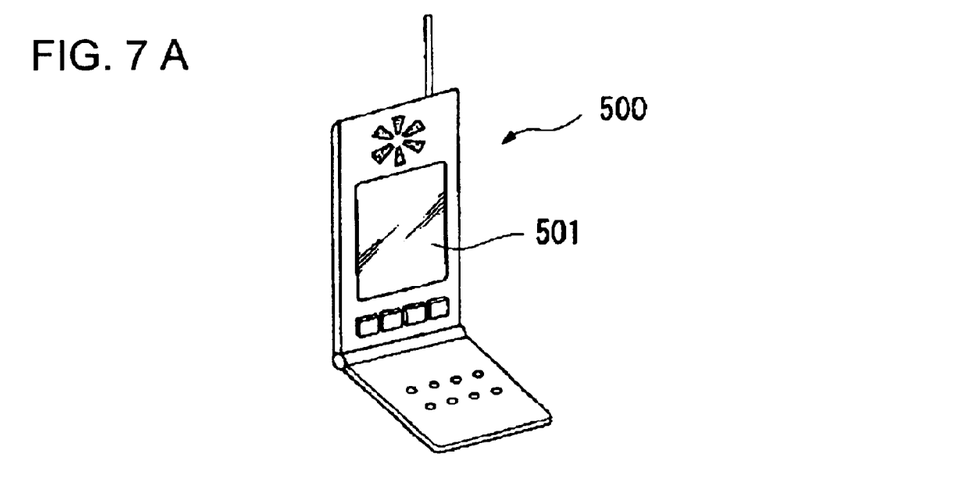
FIGS. 7A to 7C are exemplary electronic apparatuses, each equipped with the liquid crystal display device according to the exemplary embodiment of the present invention as a display unit.

FIG. 7A is a perspective view of an example portable phone. In FIG. 7A, reference numerals 500 and 501, respectively, represent a main body of the portable phone and a display unit using the liquid crystal display device 10 according to the exemplary embodiment shown in FIG. 1 so as to serve as a display.

FIG. 7B is a perspective view of an example wristwatch-type electronic apparatus. In FIG. 7B, reference numerals 600 and 601, respectively, represent a main body of the watch and a display unit using the liquid crystal display device 10 according to the exemplary embodiment shown in FIG. 1 so as to serve as a display.

FIG. 7C is a perspective view of an exemplary portable information processor, such as a word processor or a personal computer, for example. In FIG. 7C, reference numerals 700, 701, 703, and 702, respectively, represent an information processor, an input unit including a keyboard, a main body of the information processor, and a display unit using the liquid crystal display device 10 according to the exemplary embodiment shown in FIG. 1 so as to serve as a display.

Each of the electronic apparatuses shown in FIGS. 7A to 7C is equipped with the corresponding display unit using the liquid crystal display device 10 according to the foregoing exemplary embodiment, whereby the electronic apparatus produces bright display and achieves excellent display quality even in an environment in which external light is incident on the display unit.

[Advantages]

As described above in detail, a liquid crystal display device according to the present invention includes: (i) a liquid crystal display panel including: an upper substrate and a lower substrate disposed so as to oppose each other; a liquid crystal layer sandwiched between the two substrates; and an upper polarizer and a lower polarizer respectively disposed above and below the liquid crystal layer; and (ii) an illumination device disposed close to the rear surface of the liquid crystal display panel. The illumination device includes a prism sheet which has a prism surface having a plurality of ribs, each having an approximately triangular cross-section, formed thereon close to the liquid crystal display panel, and which is arranged such that the prism surface faces in the opposite direction to the liquid crystal display panel. Also, the lower polarizer has a light diffusing layer and a reflective polarizer deposited in that order on the outer surface thereof. With this structure, since the substantial display luminance of the liquid crystal display panel can be enhanced due to the off-axis reflection of the prism sheet and the utilization efficiency of light incident on the rear surface of the liquid crystal display panel can be enhanced by the reflective polarizer and the light diffusing layer, thereby achieving high visibility even in an environment where external light is incident on the liquid crystal display panel.

What is claimed is:

1. A liquid crystal display device, comprising:

a liquid crystal display panel that includes: a first substrate and a second substrate disposed so as to oppose each other; a liquid crystal layer sandwiched between the two substrates; and a first polarizer and a second polarizer respectively disposed on opposite sides of the liquid crystal layer; and an illumination device disposed to one side of the liquid crystal display panel, the illumination device including a prism sheet which has a prism surface having a plurality of ribs, each having an approximately triangular cross-section, close to the liquid crystal display panel, and which is arranged such that the prism surface faces in the opposite direction to the liquid crystal display panel, and the second polarizer having a light diffusing layer and a reflective polarizer disposed in that order on an outer surface of the second polarizer, the reflective polarizer having a transmissive polarization axis, each rib having two inclined surfaces, light from the liquid crystal display panel reflecting from a first inclined surface of a first rib, falling incident on the first inclined surface of a second rib, which is adjacent to the first rib, reflecting off a second inclined surface of the second rib, and passing through a surface of the prism sheet that faces the liquid crystal display panel.

2. The liquid crystal display device according to claim 1, each of the ribs of the prism sheet having an apex in a range from 63 degrees to 68 degrees.

3. The liquid crystal display device according to claim 1, the liquid crystal layer including TN (twisted nematic) liquid crystal, and the liquid crystal display panel having a clear viewing direction in a direction of about six o'clock.

4. The liquid crystal display device according to claim 1, the ribs of the prism sheet extending in a direction substantially orthogonal to an incident direction of external light in use.

5. The liquid crystal display device according to claim 1, the illumination device including a light source and a light-guiding plate, and the light source being disposed on an end surface of the light-guiding plate, the end surface extending orthogonal to the width direction of the ribs of the prism sheet.

6. The liquid crystal display device according to claim 1, the transmissive polarization axes of the second polarizer and the reflective polarizer being arranged so as to be substantially parallel to each other.

7. The liquid crystal display device according to claim 6, the transmissive polarization axes of the second polarizer and the reflective polarizer being arranged so as to form an angle in a range from −30 degrees to 30 degrees.

8. The liquid crystal display device according to claim 1, the light diffusing layer having a haze value in a range from 60% to 85%.

9. An electronic apparatus, comprising:

the liquid crystal device according to claim 1.

10. A liquid crystal display device comprising:

a liquid crystal display panel that includes:

a first substrate;

a second substrate disposed in opposition with the first substrate; and a liquid crystal layer sandwiched between the first substrate and the second substrate;

a first polarizer disposed to one side of the liquid crystal display panel;

a second polarizer disposed to an opposite side of the liquid crystal layer than the first polarizer, the second polarizer having a light diffusing layer and a reflective polarizer, the reflective polarizer being farther from the liquid crystal display panel than the light diffusing layer and having a transmissive polarization axis; and an illumination device disposed to the same side of the liquid crystal display panel as the second polarizer, the illumination device including a prism sheet having a prism surface that faces away from the liquid crystal display panel, the prism having a plurality of ribs with an approximately triangular cross-section.

11. A liquid crystal display device, comprising:

a liquid crystal display panel that includes: a first substrate and a second substrate disposed so as t oppose each other; a liquid crystal layer sandwiched between the two substrates; and a first polarizer and a second polarizer respectively disposed on opposite sides of the liquid crystal layer; and an illumination device disposed to one side of the liquid crystal display panel, the illumination device including a prism sheet arranged to one side of the liquid crystal panel, the prism sheet having a prism surface that faces away from the liquid crystal display panel, the prism surface having a plurality of ribs, each rib having an approximately triangular cross-section and two inclined surfaces, light from the liquid crystal panel reflecting from a first inclined surface of a first rib, falling incident on the first inclined surface of a second rib, which is adjacent to the first rib, reflecting off a second inclined surface of the second rib, and passing through a surface of the prism sheet that faces the liquid crystal display panel.

* * * * *